United States Patent
Mahaffey et al.

(10) Patent No.: US 10,175,965 B2
(45) Date of Patent: *Jan. 8, 2019

(54) MULTIPHASED PROFILE GUIDED OPTIMIZATION

(71) Applicant: MICROSOFT TECHNOLOGY LICENSING, LLC., Redmond, WA (US)

(72) Inventors: Terry Jack Mahaffey, Redmond, WA (US); Ten H. Tzen, Sammamish, WA (US); Pratap Chandar Joseph, Seattle, WA (US)

(73) Assignee: MICROSOFT TECHNOLOGY LICENSING, LLC., Redmond, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/436,865

(22) Filed: Feb. 20, 2017

(65) Prior Publication Data

US 2017/0300308 A1    Oct. 19, 2017

Related U.S. Application Data

(63) Continuation of application No. 14/292,347, filed on May 30, 2014, now Pat. No. 9,612,809.

(51) Int. Cl.
G06F 8/41          (2018.01)

(52) U.S. Cl.
CPC ............ *G06F 8/4441* (2013.01); *G06F 8/443* (2013.01)

(58) Field of Classification Search
USPC ................................................. 717/140–158
See application file for complete search history.

(56) References Cited

U.S. PATENT DOCUMENTS

| | | |
|---|---|---|
| 7,032,217 B2 | 4/2006 | Wu |
| 7,120,906 B1 | 10/2006 | Stephenson et al. |
| 7,389,502 B2 | 6/2008 | Nefian et al. |
| 7,934,208 B2 | 4/2011 | Corry et al. |
| 8,108,849 B2 | 1/2012 | Adolphson et al. |
| 8,359,587 B2 | 1/2013 | Song et al. |
| 8,429,639 B2 | 4/2013 | Jirka |

(Continued)

FOREIGN PATENT DOCUMENTS

EP    2662770 A1    11/2013

OTHER PUBLICATIONS

"Improve Application Performance and Developer Productivity using the Latest IBM XL C/C++ Compilers for IBM Power System", Retrieved from <<https://web.archive.org/web/20140609110314/http://www-01.ibm.com/support/docview.wss?uid=swg27027518&aid=1>>, May 2012, 5 Pages.

(Continued)

*Primary Examiner* — Chuck O Kendall

(57) ABSTRACT

Multiphased profile guided optimization optimizes executable code based on data collected during multiple training runs of a training executable. In multiphased profile guided optimization, multiple sets of profiling data are collected where each set of profiling data is associated with a program phase and a particular training run. Program phases include but are not limited to different program features, startup, steady state and shutdown. The program features can run concurrently. Priority of the phases can be specified.

20 Claims, 4 Drawing Sheets

(56) References Cited

U.S. PATENT DOCUMENTS

| | | |
|---|---|---|
| 8,543,907 B1 | 9/2013 | Roskind |
| 9,612,809 B2 * | 4/2017 | Mahaffey .............. G06F 8/4441 |
| 2003/0079214 A1 | 4/2003 | Ghobrial et al. |
| 2007/0079294 A1 | 4/2007 | Knight et al. |
| 2007/0089097 A1 | 4/2007 | Hu et al. |
| 2008/0229028 A1 | 9/2008 | Cascaval et al. |
| 2013/0067441 A1 | 3/2013 | Lafreniere et al. |

OTHER PUBLICATIONS

"Final Office Action Issued in U.S. Appl. No. 14/292,347", dated Jul. 1, 2016, 10 Pages.

"Final Office Action Issued in U.S. Appl. No. 14/292,347" dated Nov. 30, 2015, 7 Pages.

"Non Final Office Action Issued in U.S. Appl. No. 14/292,347", dated Mar. 4, 2016, 9 Pages.

"Non Final Office Action Issued in U.S. Appl. No. 14/292,347", dated Jan. 14, 2015, 8 Pages.

"Non Final Office Action Issued in U.S. Appl. No. 14/292,347", dated May 19, 2015, 7 Pages.

"Notice of Allowance Issued in U.S. Appl. No. 14/292,347", dated Nov. 18, 2016, 7 Pages.

\* cited by examiner

MULTIPHASED PROFILE GUIDED OPTIMIZATION

CROSS REFERENCE TO RELATED APPLICATIONS

This is a continuation of application Ser. No. 14/292,347 filed on May 30, 2014, entitled "MULTIPHASED PROFILE GUIDED OPTIMIZATION", the entirety of which is incorporated by reference.

BACKGROUND

Profiling is a type of dynamic program analysis that measures, for example, the memory used by a program, how many times a particular function is called and so on. Profile-guided optimization is a compiler optimization technique in which profiling is used to improve program runtime performance. In contrast to traditional compiler optimization techniques that only use the source code to make optimizations, profile-guided optimization uses the results of profiling test runs of instrumented programs to optimize the final generated code. As one example, "hotspots", sections of code that are executed frequently, can be identified and that code can be made more efficient.

SUMMARY

Multiphased profile guided optimization optimizes executable code based on profile data collected during multiple training runs of a training executable. In multiphased profile guided optimization, multiple sets of profiling data are collected where each set of profiling data is associated with a program phase and a particular training run. The set of data associated with one phase can be kept separate from other sets of data associated with other phases. Program phases include but are not limited to different program features, startup, steady state and shutdown. Data collection for each phase can be sequential. The beginning of a phase and the end of a phase can be explicitly specified. Phase specific code can be executed in between the specified beginning and ending points. Program phases can be optimized in accordance with provided priorities.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

In known forms of profile guided compiler optimization, source code is provided to a compiler and is compiled into a training executable. Training data is provided to the training executable and profile statistics are collected when the training executable is run. The profile statistics are used to optimize the results of a second profile guided compilation for the program. Often when code is made more efficient it becomes larger. This trade off often only makes sense for "hot" code; code that is executed frequently. Profile statistics collected by known profile guided optimizing compilers include only counts: how many times a particular function or block of code was executed, how many times a branch was taken, and so on. Counts are stored in memory at training time. The amount of memory used to store counts during training often exceeds or greatly exceeds the amount of memory used by the program proper. This is one reason why training is often slow.

In accordance with aspects of the subject matter described herein, multiple training data sets are provided to the training executable, where each training set is associated with a particular phase of the program. This enables the multiphased optimizing compiler to optimize phases of the program. For example, suppose a user wants to optimize startup. Traditional profile guided compiler optimization may produce a fast executable overall, but startup may still be slow. Suppose for example, in a particular training run three functions are executed. Suppose function a is executed the most often, function b is executed the second most often and function c is executed the least often. The optimized binary may place function a in the most accessible location, place function b in a less accessible location and place function c in the least accessible location. But suppose startup does not invoke function a or function b but instead invokes function c many times. Optimizing the overall program in this case will not make startup run faster.

In contrast, in accordance with aspects of the subject matter described herein, the execution of a particular phase of a program can be optimized by collecting profile statistics for each phase of execution of a program separately. This enables counts to be kept for each function, block of code or feature used in each program phase. To continue the example above, profile statistics can indicate that because function c is executed the most often in startup, the code in function c can be optimized, and co-located with other startup code, thus decreasing disk I/O to page in code as well as providing other benefits throughout the cache hierarchy, thereby improving startup performance.

Multiphased Profile Guided Optimization

Figure 1:
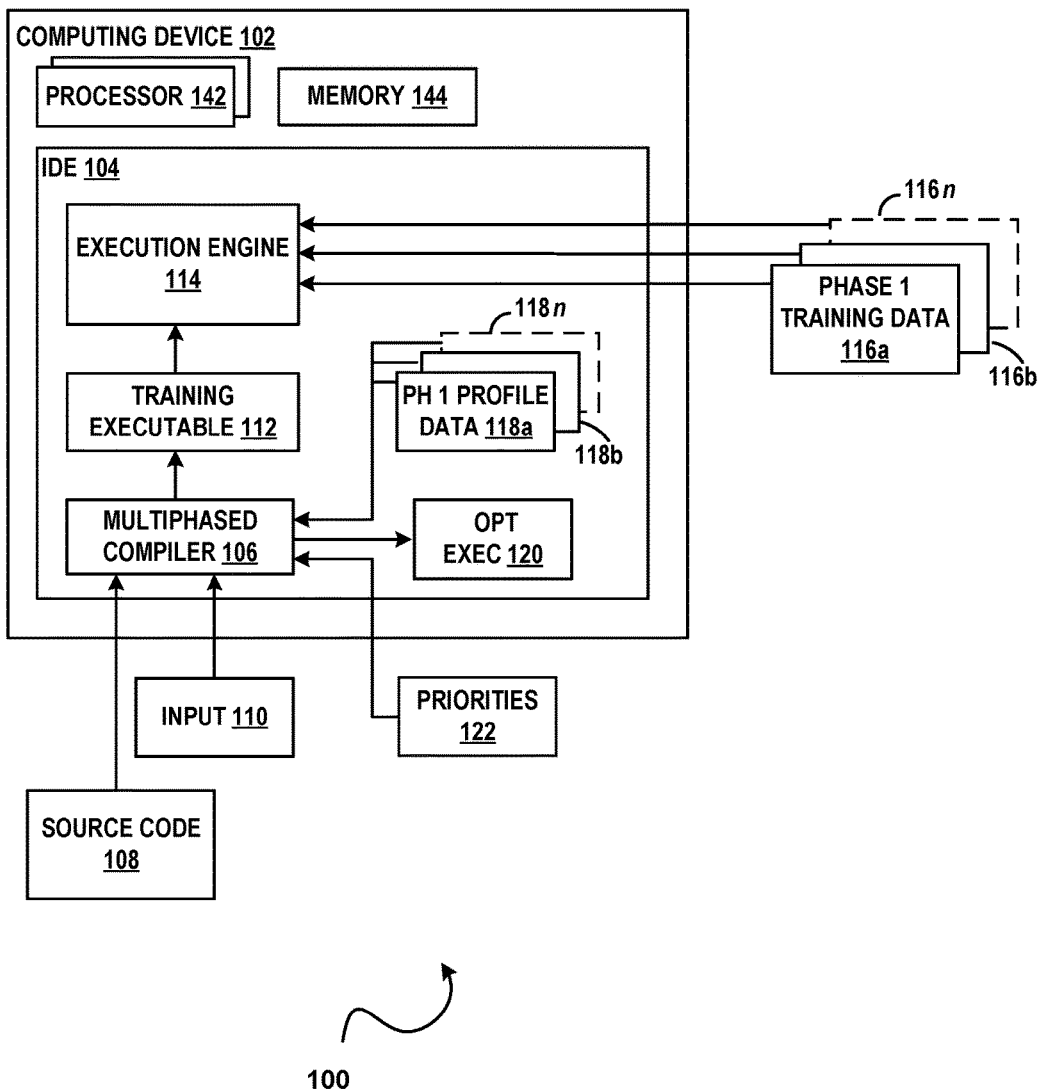
FIG. 1 illustrates an example of a system 100 comprising an optimizing compiler in accordance with aspects of the subject matter described herein.

FIG. 1 illustrates an example of a system 100 comprising an optimizing compiler in accordance with aspects of the subject matter described herein. All or portions of system 100 may reside on one or more computers or computing devices such as the computers described below with respect to FIG. 3. System 100 may execute on a software development computer such as the software development computer described with respect to FIG. 4. System 100 or portions thereof may execute within an integrated development environment or IDE such as IDE 104 or may execute outside of an IDE. The IDE can be an IDE such as the one described with respect to FIG. 4 or can be any other IDE. System 100 or portions thereof may be provided as a stand-alone system or as a plug-in or add-in.

System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

System 100 can include one or more computing devices such as, for example, computing device 102. Contemplated computing devices include but are not limited to desktop computers, tablet computers, laptop computers, notebook computers, personal digital assistants, smart phones, cellular telephones, mobile telephones, and so on. A computing device such as computing device 102 can include one or more processors such as processor 142, etc., and a memory such as memory 144 that communicates with the one or more processors.

System 100 may include one or more of: a compiler and/or one or more of: an execution engine. The compiler can be a background compiler, a parallel compiler or an incremental compiler, a plug-in, an add-in or extension to an IDE, parser, compiler or pre-processor. The compiler can compile source code such as source code 108 written in any programming language into native code, intermediate code or managed code. The compiler can be a multiphased compiler such as multiphased compiler 106 that receives input such as input 110 that can instruct multiphased compiler 106 to generate a training executable such as for example, training executable 112. Training executable 112 can be an executable that is instrumented with instructions that collect profile data. For example, training executable 112 can be instrumented to collect information such as how many times a particular function, multiple functions or all functions are called, how many times a particular block or multiple blocks of code are accessed, how many times a particular feature or features are invoked and so on. Counts can be path specific. For example, suppose function A calls function Foo and function B calls function Foo. A separate set of counts can be collected for the function A calling function Foo path and for the function B calling function Foo path. For every switch statement, a histogram of counts of values can be generated. For every indirect call, a histogram of call targets can be generated. For every division operation, a histogram of the divisors can be generated.

Multiphased compiler 106 can be a multiphased profile guided optimizing compiler that receives multiple sets of profile data such as for example phase 1 profile data such as phase 1 profile data 118a, phase 2 profile data such as phase 2 profile data 118b . . . phase n profile data such as phase n profile data 118n. Alternatively, (not shown), phase 1 profile data, phase 2 profile data . . . phase n profile data can be combined into a single dataset and provided to the multiphased compiler. Profile data for a phase can be in a single separate dataset or database. Counts can be collected in a count file or can be combined into a database of profiling data. Profile data can include an indication of what phase of the program they were collected for. For example, profile data collected when a program was starting up can be so labeled, profile data collected during steady state execution of a program can be so labeled, profile data collected when a program was shutting down can be so labeled, profile data collected when a program was executing a particular feature can be so labeled and so on.

The multiphased compiler can receive input (not shown) that indicates the way the program is to be optimized, (e.g., optimize by location, placing all the executable code associated with the highest priority phase in the most accessible location or optimize by making all the executable code associated with the highest priority phase the most efficient code possible, etc.) A user can provide priority for the phases. In accordance with some aspects of the subject matter disclosed herein, if the priority for the phase is not received, the priority can be based on the total amount of code executed in a specific phase. The multiphased compiler can receive priorities such as priorities 122 that tell the compiler in what priority the phases of the program are to be optimized. For example, priority information can indicate that the startup phase of the program is of the highest priority followed by steady state and then by shutdown. Similarly, priority information can indicate which feature of the program is highest priority and so on. In response the multiphased compiler can optimize the executable such as optimized executable 120 to achieve the fastest running speed of the highest priority phase of the program and so on. For example, in response to receiving startup profile data, the multiphased compiler can optimize execution of startup, in response to receiving steady state profile data, the multiphased compiler can optimize execution of steady state, in response to receiving shutdown profile data, the multiphased compiler can optimize execution of shutdown, in response to receiving profile data for a particular feature, the multiphased compiler can optimize execution of that feature. It will be appreciated that code from one phase can call code from other phases. Additionally, given phases A B and C, code which executes in phase A and in phase B that is placed in phase B, can be placed at the beginning of phase B (i.e., closest to phase A). Similarly any functions executing in phase B and in phase C can be placed at the end of phase B (i.e., closest to phase C).

An execution engine such as execution engine 114 can receive multiple training datasets such as, for example, phase 1 training data 116a, phase 2 training data 116b . . . phase n training data 116n. The training sets can be the same or different. For example, a first training set can test feature 1 and a second training set can test feature 2. Alternatively, the same training data can be executed multiple times, once for each phase. In accordance with yet another aspect of the subject matter described herein, a single training set can include a first set of training data that is labeled for execution in a first phase, a second training set that is labeled for execution in a second phase and so on.

Execution engine 114 can generate multiple sets of profile data. Each set of profile data can be associated with a different phase of the program. For example, a first set of profile data such as phase 1 profile data 118a can be associated with a first phase of a program (e.g., with the start up phase of training executable 112), a second set of profile data such as phase 2 profile data 118b can be associated with a second phase of a program (e.g., with the shutdown phase of training executable 112) and so on. Alternatively, multiple sets of data can be associated with a single phase of the program. Data collected in certain time slices or time periods (sometimes referred to as "time order bits") can be separated into different phases such that each time slice becomes a separate phase.

Figure 2:
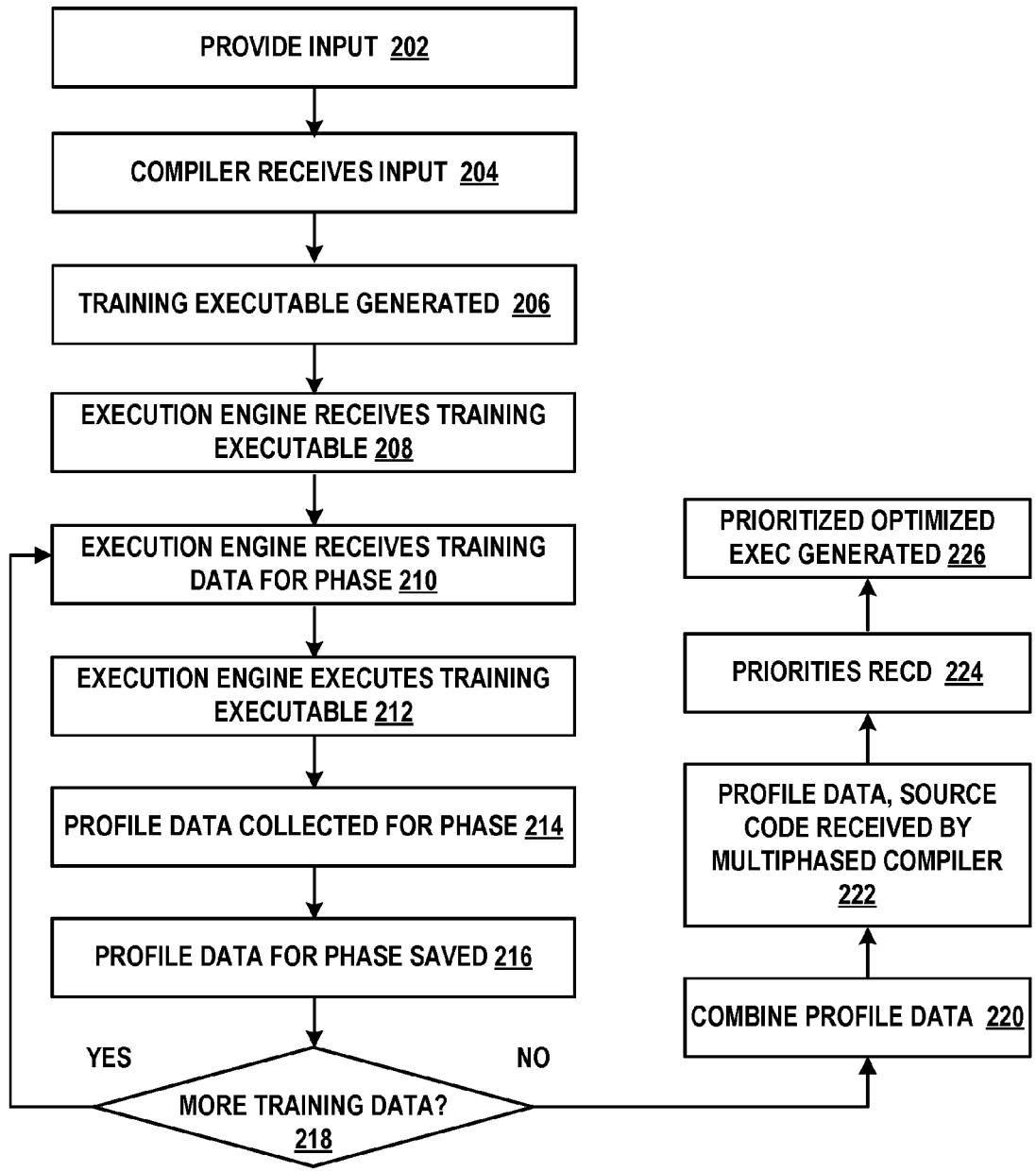
FIG. 2 illustrates an example of a method 200 comprising a method of performing multiphased profile guided compiler optimization in accordance with aspects of the subject matter disclosed herein.

FIG. 2 illustrates an example of a method 200 for performing multiphased profile guided compiler optimization in accordance with aspects of the subject matter described herein. The method described in FIG. 2 can be practiced by a system such as but not limited to the one described with respect to FIG. 1. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed.

As described more fully above, at operation 202 source code and input that indicates that a training executable is to be built can be provided to a compiler. The compiler may be a multiphased compiler. At operation 204 the input and source code can be received by the compiler. At operation 206 the compiler can generate a training executable. At operation 208 an execution engine can receive the training executable. At operation 210 a set of training data can be received, the training data associated with a particular phase of the program. At operation 212 the execution engine can execute the training executable using the training data. At operation 214 profile data associated with that particular phase can be collected. As described more fully above, the profile data may be labeled to identify the phase to which it belongs.

At operation 216, at the end of the phase, the profile data for the phase can be saved. At 218 in response to determining that another set of training data is available, processing can return to operation 210. At operation 216 in response to determining that all available training data has been processed, processing can continue at operation 220. At operation 220 optionally the labeled profile data can be combined. At operation 222 the profile data and program source code can be provided to a multiphased compiler. At operation 224 priority information can be received by the multiphased compiler. Optionally, additional input may be received to indicate the type of optimization to be performed. At operation 226 an optimized executable can be generated, where the highest priority phase of the program is optimized.

Example of a Suitable Computing Environment

Figure 3:
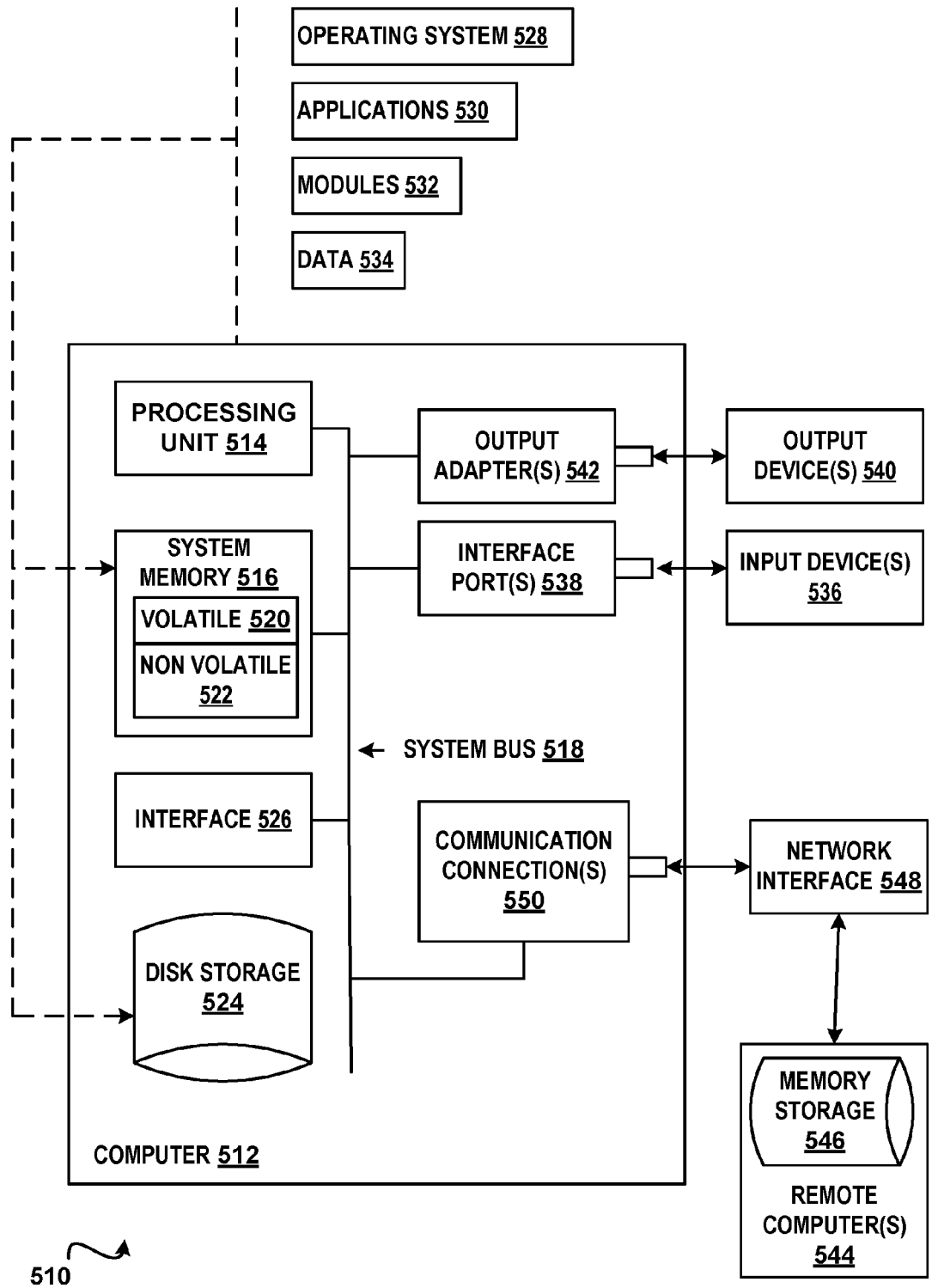
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Figure 4:
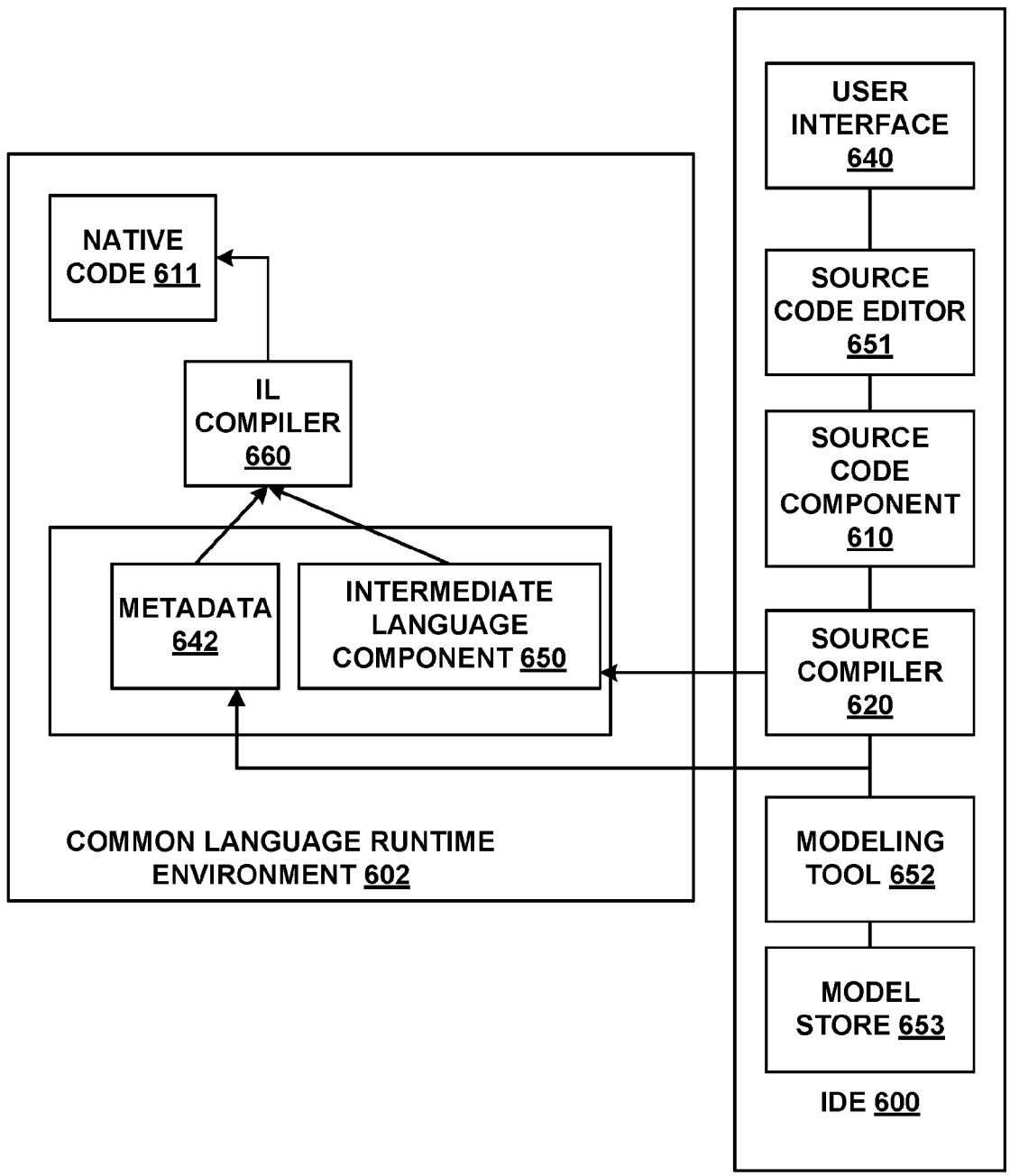
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++, C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   at least one processor; and
   a memory connected to the at least one processor;
   wherein the at least one processor is configured to:
   receive a plurality of sets of profile data for a program, the program including a plurality of phases, a phase represents a select portion of the program, a set of profile data generated from execution of a particular phase of the program;
   prioritize optimization of one or more phases of the program based on a priority order and the plurality of sets of profile data; and
   generate an optimize executable of the program.

2. The system of claim 1, wherein the plurality of phases including at least one of startup, steady state, shutdown, and/or a program feature.

3. The system of claim 1, wherein the plurality of sets of profile data is received from a cloud computing environment.

4. The system of claim 1, wherein the priority order is based on input that identifies an order for optimization of the plurality of phases.

5. The system of claim 1, wherein a phase is identified by a beginning point and an ending point in the program.

6. The system of claim 1, wherein the priority order is based on a total amount of code executed in a phase.

7. The system of claim 1, wherein the at least one processor generates a set of profile data using training data specific to test a single phase.

8. The system of claim 1, wherein the at least one processor executes training data to generate a set of profile data for more than one phase.

9. A method comprising:
   receiving source code for a program, the program including a plurality of program phases;
   receiving a plurality of sets of training data, a set of training data of the plurality of sets of training data associated with a program phase of the plurality of program phases;
   generating one or more sets of profiling data, a set of profiling data generated during execution of a select program phase of the program using a set of training data corresponding to the select program phase;
   receiving input specifying a priority for optimization of the plurality of program phases; and
   optimizing executable code for the program phases of the plurality of program phases in accordance with the priority and the one or more sets of profiling data.

10. The method of claim 9, wherein a program phase of the plurality of program phases is one of start up, shutdown or steady state.

11. The method of claim 9, wherein a program phase of the plurality of program phases comprises a feature of the program.

12. The method of claim 11, wherein a plurality of features can execute concurrently.

13. The method of claim 9, wherein the priority for optimization is based on frequency of execution of a program phase.

14. The method of claim 9, wherein the priority for optimization is based on an amount of executed code within a program phase.

15. The method of claim 9, wherein the one or more sets of profiling data is generated from a separate execution of the program.

16. A method, comprising:
   obtaining, at a computing device having at least one processor and a memory, a plurality of sets of profile data for a program, the program including a plurality of phases, a phase represents a select portion of the program, a set of profile data generated from execution of a particular phase of the program;
   prioritizing optimization of one or more phases of the program based on a priority order and the plurality of sets of profile data; and
   generating an optimize executable of the program.

17. The method of claim 16, wherein the priority order is based on a total amount of code executed in a phase.

18. The method of claim 16, wherein a program phase of the plurality of program phases comprises a feature of the program.

19. The method of claim 16, further comprising:
   generating a set of profile data using training data specific to test a single phase.

20. The method of claim 16, wherein a phase is identified by a beginning point and an ending point in the program.

* * * * *